(12) United States Patent
Brumley

(10) Patent No.: US 9,621,525 B2
(45) Date of Patent: Apr. 11, 2017

(54) SEMI-DETERMINISTIC DIGITAL SIGNATURE GENERATION

(71) Applicant: QUALCOMM Incorporated, San Diego, CA (US)

(72) Inventor: Billy Bob Brumley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 14/294,015

(22) Filed: Jun. 2, 2014

(65) Prior Publication Data

US 2015/0350171 A1  Dec. 3, 2015

(51) Int. Cl.
*H04L 9/32* (2006.01)
*H04L 29/06* (2006.01)
*H04L 9/00* (2006.01)

(52) U.S. Cl.
CPC ............ *H04L 63/061* (2013.01); *H04L 9/002* (2013.01); *H04L 9/3247* (2013.01); *H04L 63/0876* (2013.01)

(58) Field of Classification Search
CPC ........ H04L 9/3247; H04L 9/30; H04L 9/3252
USPC .................................................. 713/176, 170
See application file for complete search history.

(56) References Cited

U.S. PATENT DOCUMENTS

| | | | | |
|---|---|---|---|---|
| 5,231,668 A * | 7/1993 | Kravitz | ................. | H04L 9/3013 380/28 |
| 7,080,041 B2 * | 7/2006 | Nagel | ................. | G06K 19/086 380/202 |
| 7,490,239 B2 * | 2/2009 | Beeson | ................. | H04L 9/3226 713/176 |
| 7,693,277 B2 * | 4/2010 | Beeson | ................. | H04L 9/3252 380/282 |
| 7,869,593 B2 * | 1/2011 | Beeson | ................. | H04L 9/3066 380/30 |
| 8,274,968 B2 | 9/2012 | Rosenberg et al. | | |
| 2011/0113253 A1 * | 5/2011 | Volkovs | ................. | H04L 9/002 713/176 |

(Continued)

FOREIGN PATENT DOCUMENTS

WO  WO-2013097027 A1  7/2013

OTHER PUBLICATIONS

International Search Report and Written Opinion—PCT/US2015/033608—ISA/EPO—Aug. 12, 2015.

(Continued)

*Primary Examiner* — Samson Lemma
(74) *Attorney, Agent, or Firm* — Loza & Loza, LLP

(57) ABSTRACT

Various features pertain to digital signatures for use in signing messages. In one aspect, a digital signature is generated based on a nonce derived using a per-message salt value, particularly a salt selected to provide a semi-deterministic nonce (i.e. a nonce that is neither fully deterministic nor completely random.) In one example, the nonce is generated by concatenating the salt value with a long-term private key and then applying the result to a key derivation function along with a hash of the message to be signed. The salt value may be, e.g., a counter, a context-specific message or may be randomly generated within a restricted range of values (relative to a full range of values associated with the particular digital signature generation protocol used to generate a digital signature from the nonce.)

32 Claims, 12 Drawing Sheets

(56) References Cited

U.S. PATENT DOCUMENTS

2014/0032922 A1 1/2014 Spilman
2014/0365779 A1* 12/2014 Brown ............... H04L 9/3252
                                                                      713/176

OTHER PUBLICATIONS

Pornin T, "Deterministic Usage of the Digital Signature Algorithm (DSA) and Elliptic Curve Digital Signature Algorithm (ECDSA)", RFC 6979, Deterministic Usage of the Digital Signature Algorithm (DSA) and Elliptic Curve Digital Signature Algorithm (ECDSA); RFC6979.txt, Internet Engineering Task Force, IETF; Standard, Internet Society (ISOC) 4, Rue Des Falaises CH-1205 Geneva, Switzerlan, Aug. 8, 2013, XP015094981, pp. 1-79. [retrieved on Aug. 8, 2013].

Canetti R., et al., "Universally Composable Symbolic Analysis of Cryptographic Protocols," (the case of encryption-based mutual authentication and key exchange). Cryptology ePrint Archive, Report 2004/334, Feb. 22, 2005, URL: http://security.stackexchange.com/questions/3165/hmac-why-not-hmac-for-password-storage, 51 pages.

Ghosh M., "The Pseudo Random Bit Bucket," Moinakg's Ramblings, Nov. 2012, URL: http://moinakg.wordpress.com/tag/hmac/, 4 Pages.

Mortensen J., et al., "HMAC—Why not HMAC for password storage?" Information Security Stack Exchange, Sep. 2013, URL: http://security.stackexchange.com/questions/3165/hmac-why-not-hmac-for-password-storage, 2 pages.

* cited by examiner

EXEMPLARY PROCEDURE FOR GENERATING A DIGITAL SIGNATURE BASED ON A NONCE DERIVED USING A SALT ← 600

602 — Obtain a per-message salt value $v$ sufficient to yield a non-random and non-deterministic nonce (i.e. a semi-deterministic nonce) where, e.g., the salt $v$ is a secret nonce, a public nonce, a counter, a context-specific message, an empty string or the result of any suitable semi-deterministic function $s(x)$ or where the salt is randomly obtained within a restricted range of values (relative to a full range of values associated with a digital signature generation protocol used to generate a digital signature from a nonce) so that the resulting nonce is not fully random.

604 — Generate the nonce $k$ based on the per-message salt value $v$, a hash-based message authentication code (HMAC) key derivation function, a private key $d$ and a message $m$ to be signed by, for example:

concatenating the private key $d$ with the salt $v$ to yield a concatenated value;

applying a hash function $h$ to the message $m$ to yield a hashed message $h(m)$; and applying the HMAC function to the concatenated value and the hashed message to yield the nonce $k$, e.g.:

$k = \text{HMAC}(d \| v, h(m))$ or
$k = \text{HMAC}(v \| d, h(m))$.

606 — Generate digital signature $(r,s)$ based, in part, on nonce $k$ and sign the message $m$ using, for example, DSA procedures:

$r = g^k \bmod p \bmod q$ and
$s = k^{-1}(h(m) + rd) \bmod q$ where $p$ is a prime, $q$ is a group order and $g$ is a group generator, or using other nonce-based procedures such as ECDSA, El Gamal, Schnorr, Nyberg-Rueppel, GOST R 34.10-2001 or Korean Certificate-based DSA (KCDSA).

*FIG. 6*

SEMI-DETERMINISTIC DIGITAL SIGNATURE GENERATION

BACKGROUND

Field of the Disclosure

Various features relate to digital signature generation, particularly nonce-based digital signature generation.

Description of Related Art

Digital signature schemes such as Digital Signature Algorithm (DSA) and Elliptic Curve DSA (ECDSA) can fail if nonces (i.e. per-message secret numbers used by such procedures) are reused for different messages. That is, a hacker or malicious entity can determine the long-term secret key used with the digital signature, thereby allowing the malicious entity to create false signatures that otherwise appear valid. To address this issue, deterministic generation of nonces has being proposed wherein a nonce k is generated roughly in accordance with k=HMAC(d, h(m)), where d is a long-term private key, h is a hash function, m is a message to be signed and HMAC is a Hash-based Message Authentication Code function. Each message thereby leads deterministically to a single k value for a given key d. A deterministic approach is described, for example, in "Deterministic Usage of the Digital Signature Algorithm (DSA) and Elliptic Curve Digital Signature Algorithm (ECDSA)" by T. Pornin, August 2013. One issue with a deterministic approach is that it potentially exposes the private key to certain side-channel attacks, e.g. differential power analysis (DPA), because the attacker can repeat measurements to reduce noise that would otherwise hinder the attack.

According to the Request for Comments (RFC) for the aforementioned paper (i.e. RFC 6979, ISSN: 2070-1721), side-channel attacks are a consideration whenever an attacker can accurately measure aspects of an implementation such as the length of time it takes to perform a signing operation or the power consumed at each point of the signing operation. The determinism of such algorithms may thus be useful to an attacker in some forms of side-channel attacks and so implementations should use defensive measures to avoid leaking the private key through a side channel. Note that in the exponentiation or point multiplication portion of signature generation operations used to produce a signature, DSA (or similar techniques) are rarely a target for DPA-style side-channel analysis attacks utilizing side-channels such as power, electromagnetic radiation or timing because the nonce is different for each call to the signature oracle. Instead, attackers employ simple power analysis (SPA) techniques that are much more restrictive with respect to attacker capabilities, e.g. measurements cannot be repeated to reduce noise in the side-channel. Deterministic generation of nonces can help to eliminate or hinder this natural side-channel resistance. In other words, although the deterministic generation of nonces can help reduce certain vulnerabilities in digital signature techniques, other vulnerabilities can arise.

Therefore, it would be helpful to provide improved nonce-based procedures for use, for example, in generating digital signatures.

SUMMARY

A method operational in a digital signature generation device for obtaining a digital signature includes: obtaining a non-random and non-deterministic nonce using the digital signature generation device; and obtaining a digital signature using the digital signature generation device based in part on the non-random and non-deterministic nonce.

In another aspect, a device includes a processing circuit configured to obtain a non-random and non-deterministic nonce and obtain a digital signature based in part on the non-random and non-deterministic nonce.

In yet another aspect, a device includes: means for obtaining a non-random and non-deterministic nonce; and means for obtaining a digital signature based in part on the non-random and non-deterministic nonce.

In still yet another aspect, a machine-readable storage medium for obtaining a digital signature is provided, the machine-readable storage medium includes one or more instructions which when executed by at least one processing circuit causes the at least one processing circuit to: obtain a non-random and non-deterministic nonce and obtain a digital signature based in part on the non-random and non-deterministic nonce.

BRIEF DESCRIPTION OF THE DRAWINGS

FIG. 3 illustrates an exemplary cryptographic signing device, a signature verification device and information exchanged there-between.

FIG. 6 illustrates an exemplary procedure for generating a digital signature based on a nonce derived using a per-message value (i.e. a salt.)

DETAILED DESCRIPTION

Figure 1:
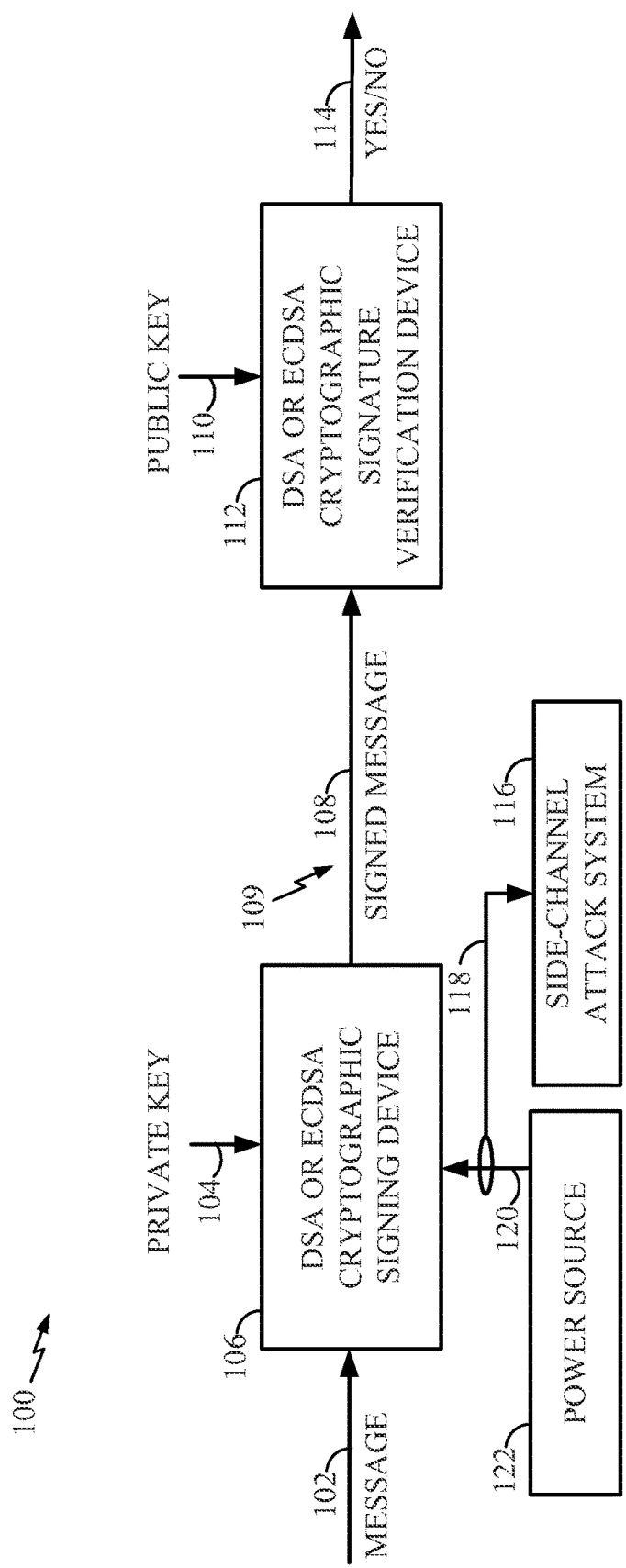
FIG. 1 illustrates a DSA/ECDSA system subject to a side-channel attack.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Several novel features pertain to devices and methods for use with nonce-based digital signature generation. An example of a nonce-based digital signature scheme is the aforementioned DSA, which is a U.S. Federal Information Processing Standard for digital signatures, originally proposed by the National Institute of Standards and Technology (NIST) in August 1991. Conventional DSA may be described as follows. Take primes p and q where $g \in F_p^x$ is of order q. Let d be a long-term private key, which is chosen at random and satisfies $1 \leq d < q$. Let $y = g^d$ mod p be the public key. Denote h a cryptographic hash function. To sign a message m, the system chooses a nonce k (i.e. a per-message secret number) uniformly at random in the range $1 \leq k < q$ and computes the signature (r,s) using:

$$r = g^k \bmod p \bmod q \quad (1)$$

$$s = k^{-1}(h(m) + rd) \bmod q \quad (2)$$

where h(m) is a hash of m such as by using Secure Hash Algorithm (SHA)-1 or SHA-2 (at least in DSA examples.)

ECDSA is similar but operates on elliptic curves of $F_p^*$. Other such signature schemes employing nonces include El Gamal, Schnorr, Nyberg-Rueppel, Russian standard GOST R 34.10-2001 Digital Signature Algorithm (where GOST is Russian acronym that effectively means "state standard"), and Korean Certificate-based DSA (KCDSA). With these techniques, if k is reused for two different messages, the scheme is immediately broken. That is, one gets two equations with two unknowns that may be solved with Gaussian elimination to determine the nonce k and the secret private key d:

$$s_1 = k^{-1}(h(m_1) + rd) \bmod q \quad (3)$$

$$s_2 = k^{-1}(h(m_2) + rd) \bmod q \quad (4)$$

Such can happen in practice by, e.g., poor cryptographic engineering or lack of entropy when signing. In this regard, DSA and ECDSA (and other similar nonce-based signature schemes) can break in practice because of the high-quality per-message randomness requirement of the nonce. As noted above, a solution has been proposed wherein k is generated deterministically, essentially computing k as follows:

$$k = \text{HMAC}(d, h(m)) \quad (5)$$

That is, each message leads deterministically to a single k value given a particular value for the secret key d. Here, HMAC is applied to the long-term private key d, producing k with a nested hash function h of a message m. Hence, no per-message randomness is required. However, as explained above, side-channel vulnerabilities can arise with deterministic nonces.

A note on terminology: the value k (which is the "per-message secret number," or "session signature key") is referred to herein as a "nonce" for convenience and brevity. However, the characteristics of the value k differ from more traditional nonces because the value k provides secrecy, uniqueness and unpredictability (i.e. entropy), whereas more traditional nonces do not provide or require each of these attributes. Hence, as the term is used herein, a "nonce" is a per-message secret number for use in digital signature generation that provides at least some amount of secrecy, uniqueness and unpredictability.

FIG. 1 illustrates an exemplary digital signature system 100 subject to a side-channel attack. Briefly, a message 102 is processed by a cryptographic signing device 106, which may employ DSA or ECDSA procedures to generate a digital signature using a private key 104 to sign the message. The signed message 108 is then transferred over a generally unsecured channel 109 where it is processed by a DSA or ECDSA signature verification device 112 using a public key 110 to yield a YES/NO verification 114. If the nonce used by the signing device 106 is deterministic, the digital signature procedure can be vulnerable to a side-channel attack device or system 116, which monitors power and timing information 118 associated with signing device 106, such as by monitoring power signals 120 provided by a power source 122 to obtain power signatures and timing information, potentially exposing the private key to an attacker or other malicious entity (e.g. a hacker.) Conversely, if the nonce used by the signing device 106 is assigned randomly (i.e. the nonce is fully nondeterministic), the digital signature procedure is vulnerable to the aforementioned Gaussian elimination procedure if the nonce is ever repeated. As noted, if the same nonce is reused for different messages, the security of the procedure fails immediately, allowing a hacker to obtain the private key.

Figure 2:
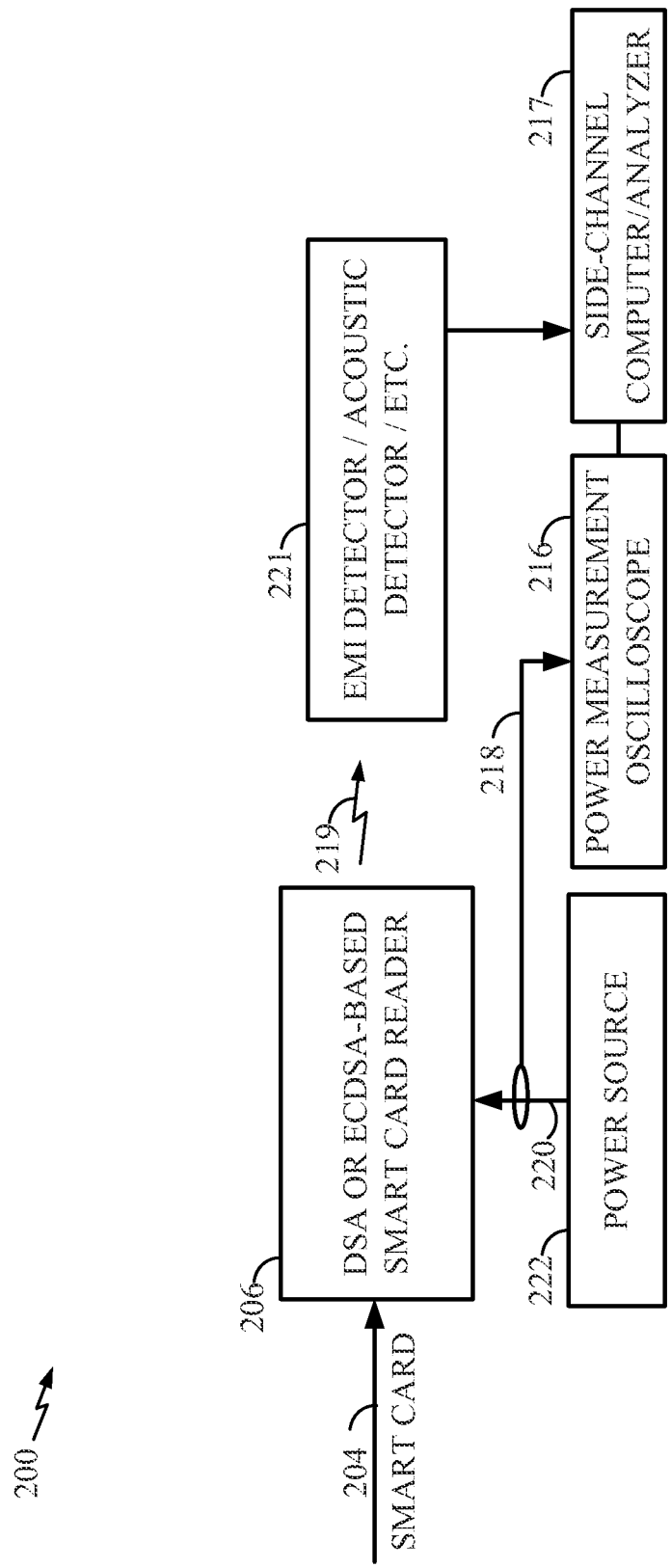
FIG. 2 illustrates another exemplary DSA/ECDSA system subject to a side-channel attack where the system includes an smart card reader.

FIG. 2 illustrates another exemplary digital signature system 200 subject to a side-channel attack, wherein the system under attack is a smart card reader 206 receiving one or more smart cards 204. Again, if the nonce used to generate a digital signature employed by the smart card is deterministic, the private key can potentially be derived by a side-channel attack system (which in this example includes a power measurement oscilloscope 216 and a side-channel computer/analyzer 217) based on power and timing information 218 obtained from power signals 220 provided by a power source 222. Still further, in this example, electromagnetic induction (EMI) signals, acoustic signals, etc., 219 may be obtained by a suitable sensor or detector 221 for analysis by computer/analyzer 217. Similar attacks may be mounted against universal serial bus (USB) devices, smartphones, etc., to derive the private key if a deterministic nonce is used.

Accordingly, in one aspect, techniques are described herein for generating a nonce k based on a per-message value (i.e. a salt) v, particularly a salt selected to yield a semi-deterministic nonce (i.e. a nonce that is neither fully deterministic nor completely random.) Note that, conventionally, a "salt" is typically considered to be a random data value that is used as an additional input to a one-way function that hashes a password or passphrase. Herein, however, the term salt refers to a per-message value that can be set to a value that is fully random, fully deterministic or neither fully-random nor fully-deterministic. In various examples described herein, the salt value is set so as to generate a semi-deterministic nonce wherein "semi-deterministic" is defined herein as being characterized by having a partial amount of determinism between fully random and fully deterministic. In other examples, however, the salt could be set to a fully random value to yield a fully random nonce. The salt could also be set to an empty string to yield a fully deterministic nonce. Semi-deterministic may also be referred to as semi-random.

Furthermore, note that the salt v may be randomly obtained within a restricted or constrained range of values. Such a salt is not fully random. Hence, a nonce obtained using a salt value that is randomly obtained within a restricted range of values (relative to a full range of values associated with the digital signature generation protocol used to generate a digital signature from the nonce) is considered herein to be a semi-deterministic nonce since the nonce will be neither fully deterministic nor fully random. Examples described herein include nonces derived from salts wherein the salt is selected "randomly" from among only 32-bit values rather than from among a much larger number of permissible values. Still further, note that herein the "non-randomness" of a non-random nonce is characterized by being at least partially deterministic and not fully random. The "non-determinism" of a non-deterministic nonce is characterized by being at least partially random and not fully deterministic.

In one particular example, a nonce k is generated as follows (where ∥ denotes concatenation):

$$k = \text{HMAC}(d\|v, h(m)) \qquad (6)$$

wherein h(m) is a hash of message m, d is the long-term key and v is the salt. The salt may be, for example, one or more of a secret nonce, a public nonce, a counter, a context-specific message or even an empty string (where the secret nonce and the public nonce can be traditional nonces not necessarily subject to the aforementioned considerations for k.) Note that, if the per-message salt value v is an empty string, the formula reverts to the deterministic approach of Eq. 5. As such, the signature scheme would remain secure against nonce reuse but potentially loses side-channel security. If v is chosen randomly and uniformly from a full range of permissible values, the scheme is fully nondeterministic and hence retains the properties of otherwise conventional nondeterministic digital signature techniques such as DSA (which are vulnerable to nonce reuse.) In cases where the per-message salt value v is non-random and non-deterministic, such as if the salt is a counter or context-specific message, the formula of Eq. 6 provides a semi-deterministic nonce k, which generally renders side-channel attacks extremely difficult due to the non-determinism introduced (while also avoiding nonce reuse.) In this regard, a counter is semi-deterministic because (a) a given message m to be signed does not lead deterministically to the same nonce k when a counter is employed and yet (b) the counter is not random and hence not fully non-deterministic. Likewise, a context-specific message is semi-deterministic because (a) a given message m does not lead deterministically to the same nonce k since the context-specific message varies based on context and yet (b) the context specific message is not a random value and hence not fully non-deterministic. A secret nonce or public nonce (used as a per-message salt value v) are likewise semi-deterministic so long as such values are not fully random nor fully deterministic. A public nonce may already be provided in a protocol message, e.g., in a "client hello" Transport Layer Security (TLS) message.

Note also that generating a nonce k based on a per-message salt value v allows the digital signature generation system to conveniently employ a random nonce in circumstances where nonce reuse is not a concern (such as if the range of values from which the nonce is randomly obtained is so large that nonce reuse is not a practical issue.) Likewise, generating a nonce k based on a per-message salt value v allows the digital signature generation system to conveniently employ a fully deterministic nonce in circumstances where side-channel attacks are not a concern. That is, the use of a per-message salt value v allows a single digital signature generation system to conveniently exploit deterministic, semi-deterministic or fully nondeterministic attributes, based on the choice of v in accordance with overall security needs. For generality herein, the function v=s(x) may be used to represent any function, procedure or algorithm for generating or otherwise obtaining a semi-deterministic per-message salt value v (from some input string, value or other function x) for use in generating a semi-deterministic nonce k. As those skilled in the art can appreciate, a wide variety of semi-deterministic functions s(x) may be provided in accordance with the general teachings herein. Note also that, herein, the term "obtaining" broadly covers, e.g., calculating, computing, generating, acquiring, receiving, retrieving, inputting or performing any other suitable corresponding actions.

Figure 3:
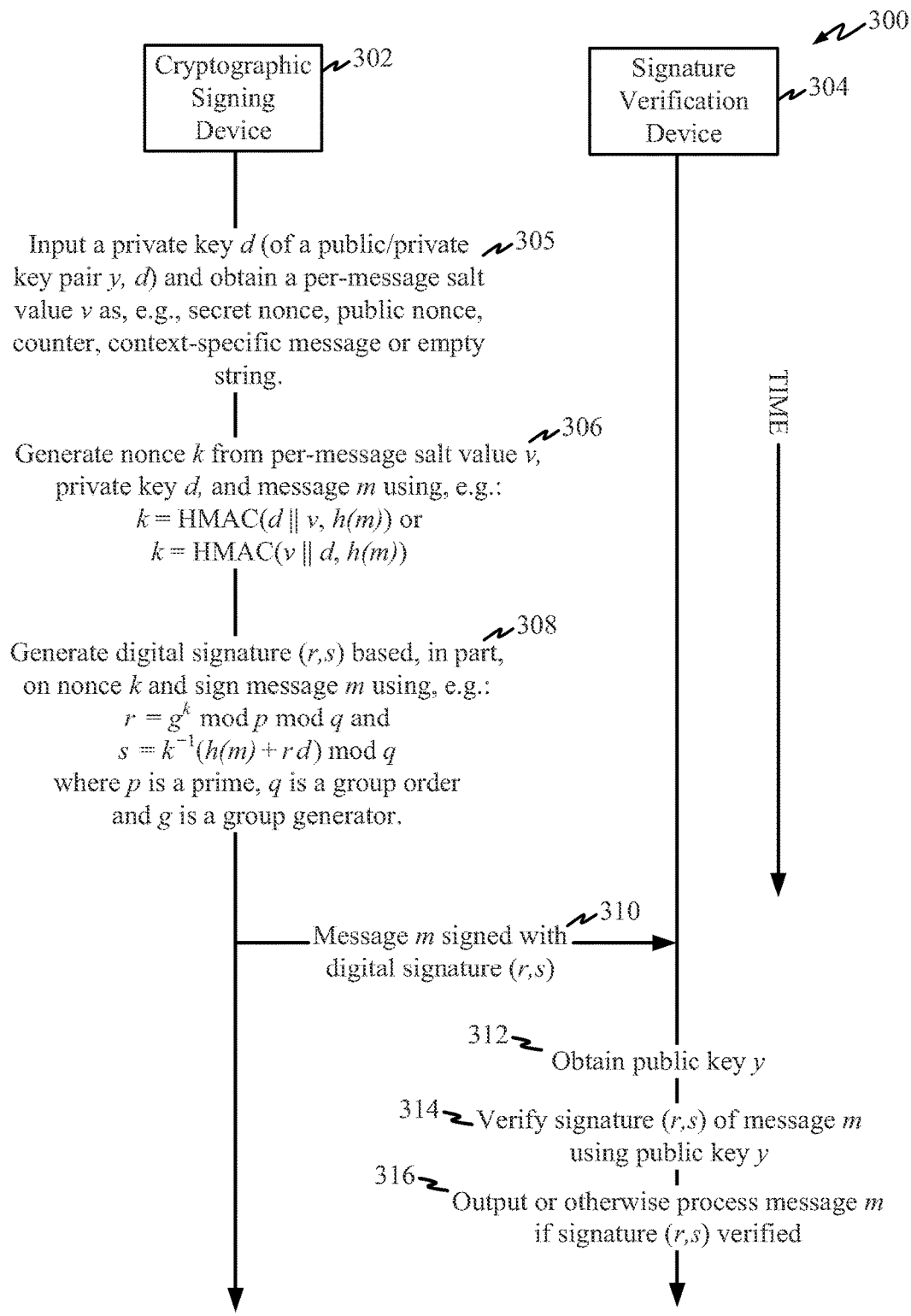

FIG. 3 provides a timing diagram 300 illustrating exemplary operations of a cryptographic signing device 302 and signature verification device 304. Processing begins at 305 with the cryptographic signing device 302 inputting a private key d (of a public/private key pair y, d that has already been established) and obtaining a per-message salt value v as, e.g., a secret nonce, a public nonce, a counter, a context-specific message or an empty string, i.e. a salt that is non-random and non-deterministic. The private key d may be input, for example, from a storage device of the cryptographic signing device 302 where it was stored following an initial public key/private key generation and exchange procedure (not shown) with the signature verification device 304 (in conjunction, in some examples, with a trusted authority device or certificate authority device, not shown.) In a DSA-based example, certain global parameters are employed including p, q and g, where p is a prime, g is a group generator and q is a group order (and is the multiplicative order of g.) In an illustrative DSA example, p is a prime number where $2^{L-1} < p < 2^L$ for $512 \le L \le 1024$ and L is a multiple of 64 (i.e., a bit length of between 512 and 1024 bits is used in increments N of 64 bits.) However, L can be longer, such as up to 3072 or more with an increment (N) of, e.g., 256. In the illustrative DSA example where L is in the range of $512 \le L \le 1024$, q is a prime divisor of p−1, where $2^{159} < q < 2^{160}$ (i.e., a bit length of 160 bits is used.) In that illustrative example, $g = h^{(p-1)/q} \bmod p$, where h is any integer with $1 < h < (p-1)$ such that $h^{(p-1)/q} \bmod p > 1$. The private key d is a random or pseudorandom integer with $0 < d < q$. The public key y is $g^d \bmod p$. This is just one illustrative example of DSA parameters to provide some background information. In practice, the various values may be chosen differently. Those skilled in the art are familiar with choosing the bit-lengths of p, q, and then the hash function for particular applications. Still further, note that the choice of parameters for ECDSA is quite different.

At 306, the cryptographic signing device 302 generates a nonce k from per-message salt value v, private key d and message m using, e.g.:

$$k = \text{HMAC}(d\|v, h(m)) \qquad (7)$$

or $$k = \text{HMAC}(v\|d, h(m)). \qquad (8)$$

Note that other key derivation functions besides HMAC may be used but HMAC is convenient. Concatenating the salt v with the private key allows the concatenated result to be applied as one of the two input parameters of HMAC (along with the hash of the message m) so that the HMAC function need not be modified. Moreover, HMAC can accept parameters of arbitrary length and hence concatenation is particularly convenient for combing the salt and the private key since HMAC can thereby accept the result regardless of length. Moreover, the use of HMAC with a concatenated salt/private key provides a generally interoperable scheme, whereby the overall mathematics of the digital signature generation, signing and subsequent verification is generally the same as with otherwise conventional nonce-based techniques. Note also that other functions besides concatenation could instead be used to combine the salt and the private key, so long as the function chosen does not result in leakage of information that a malicious entity might exploit. By way of example, XORing the salt and private key may leak side-channel information and hence is not recommended.

At 308, the cryptographic signing device 302 generates a digital signature (r,s) based in part on nonce k and signs the message m using, e.g.:

$$r = g^k \bmod p \bmod q \tag{9}$$

and $$s = k^{-1}(h(m) + rd) \bmod q. \tag{10}$$

where p is prime, q is a group order and g is a group generator, as discussed above.

At 310, the cryptographic signing device 302 transmits the message m signed with the digital signature (r,s) to a remote or external system having a signature verification device 304. Note that, in many cases, the message m will also be encrypted, but such encryption may be separate and distinct from the digital signature generation procedures discussed herein. At 312, the signature verification device 304 obtains the public key y and, at 314, verifies the signature (r,s) of message m using the public key y. The public key may be obtained, for example, from a storage device of the signature verification device 304 if stored therein following the initial key exchange procedure with the cryptographic signing device 302 (or may be obtained, e.g., from a certificate authority server.) At 316, the signature verification device 304 then outputs or otherwise processes the message m if the signature (r,s) was verified. In a DSA-based example, verification may be performed by calculating values w, u1, u2 and v as follows: $w=(s')^{-1} \bmod q$; $u1=[h(m') w] \bmod q$; $u2=(r') w \bmod q$; and $v=[(g^{u1} y^{u2}) \bmod p] \bmod q$, and wherein s', r' and m' represent received versions of r, s and m. The signature verification device then verifies that v=r'.

Exemplary System-on-a-Chip Hardware Environment

The digital signature signing and verification systems and procedures described herein can be exploited in a wide range of devices and for a wide range of applications. To provide a concrete example, an exemplary hardware environment will now be described wherein a digital signature processor with both a signing component and a verification component is provided on a SoC processing circuit for use in a mobile communication device or other access terminal. In this regard, although mobile devices have been traditionally viewed as lacking sufficient computational resources for asymmetric key cryptography (i.e. public key cryptography), mobile devices are being provided with ever more powerful processors and greater amounts of memory. With sufficient resources, asymmetric key generation, signing and verification can be provided within such devices. Other exemplary hardware environments in which the digital signature signing and verification systems and procedures may be implemented include other communication devices and components and peripheral devices for use therewith, etc., as well as traditional desktop computers and transaction servers connected to the Internet (as may be employed by Internet-based commercial vendors to facilitate on-line purchases of goods or services.) Aspects of the overall procedure may also exploit a trusted authority server to facilitate, for example, key exchange.

Figure 4:
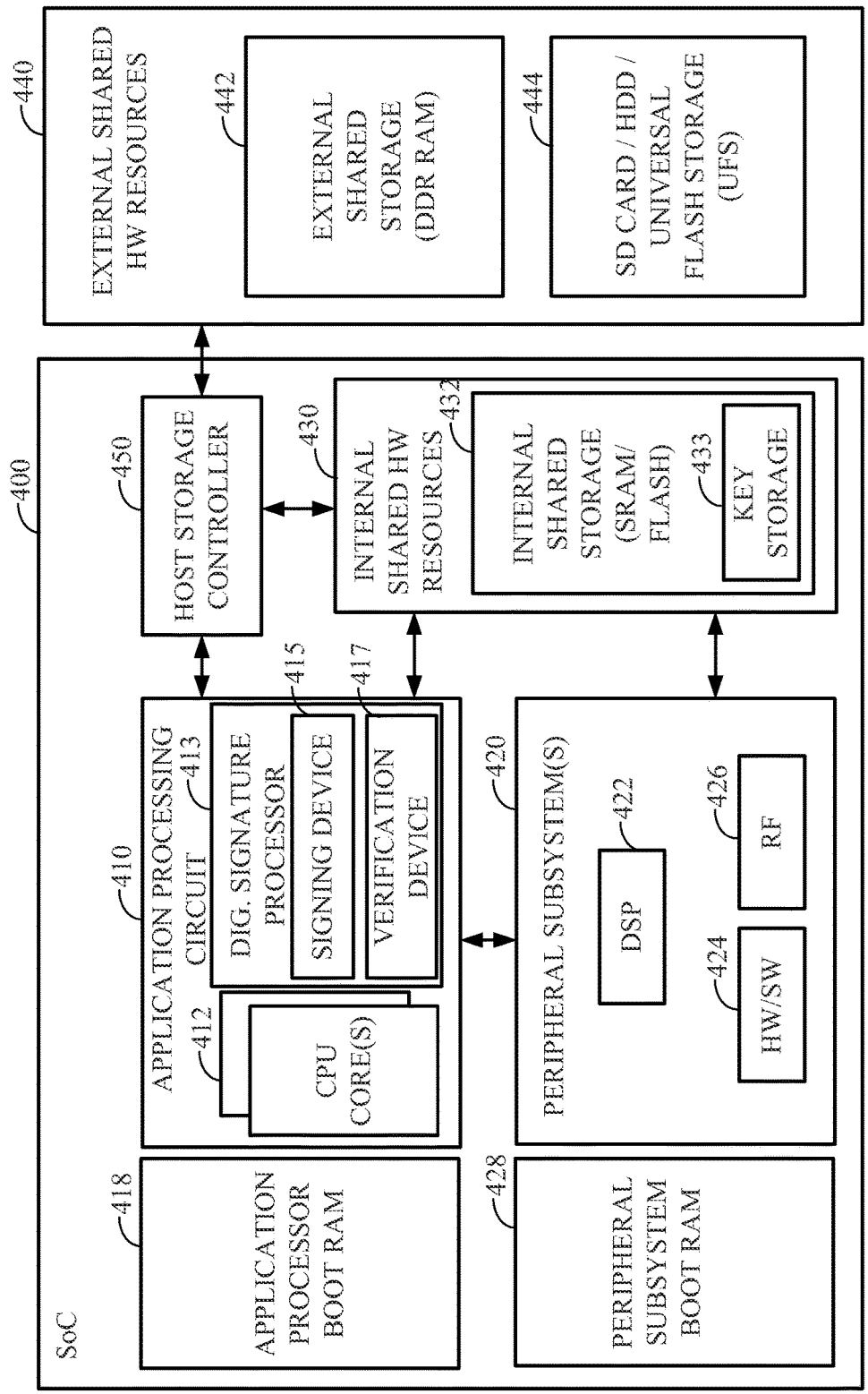
FIG. 4 illustrates an exemplary system-on-a-chip (SoC) of a mobile device wherein the SoC includes a digital signature processor having a cryptographic signing device and a signature verification device.

FIG. 4 illustrates a SoC processing circuit 400 of a mobile communication device in accordance with one example where various novel features may be exploited. The SoC processing circuit may be a Snapdragon™ processing circuit of Qualcomm Incorporated. The SoC processing circuit 400 includes an application processing circuit 410, which includes a multi-core CPU 412 equipped to operate in conjunction with a digital signature processor 413 having a digital signature signing device 415 and a digital signature verification device 417. The digital signature signing device 415 may be used for digitally signing messages to be sent to a remote system such as an on-line commercial transaction server (not shown.) The signature verification device 417 may be used to verify digital signatures received from a remote device (such as may be needed if the mobile communication device runs an application, i.e. an "app," that needs to verify signatures of received messages.) In other examples, the digital signature processor 413 may include only digital signature signing device 415 or, in some cases, only digital signature verification device 417. That is, both components are not required.

The application processing circuit 410 typically controls the operation of all components of the mobile communication device. In one aspect, the application processing circuit 410 is coupled to a host storage controller 450 for controlling storage of data, including storage of public and private keys in a key storage element 433 of an internal shared storage device 432 that forms part of internal shared hardware (HW) resources 430. The application processing circuit 410 may also include a boot ROM 418 that stores boot sequence instructions for the various components of the SoC processing circuit 400. The SoC processing circuit 400 further includes one or more peripheral subsystems 420 controlled by application processing circuit 410. The peripheral subsystems 420 may include but are not limited to a storage subsystem (e.g., read-only memory (ROM), random access memory (RAM)), a video/graphics subsystem (e.g., digital signal processing circuit (DSP), graphics processing circuit unit (GPU)), an audio subsystem (e.g., DSP, analog-to-digital converter (ADC), digital-to-analog converter (DAC)), a power management subsystem, security subsystem (e.g., other encryption components and digital rights management (DRM) components), an input/output (I/O) subsystem (e.g., keyboard, touchscreen) and wired and wireless connectivity subsystems (e.g., universal serial bus (USB), Global Positioning System (GPS), Wi-Fi, Global System Mobile (GSM), Code Division Multiple Access (CDMA), 4G Long Term Evolution (LTE) modems). The exemplary peripheral subsystem 420, which is a modem subsystem, includes a DSP 422, various other hardware (HW) and software (SW) components 424, and various radio-frequency (RF) components 426. In one aspect, each peripheral subsystem 420 also includes a boot ROM 428 that stores a primary boot image (not shown) of the associated peripheral subsystems 420.

As noted, the SoC processing circuit 400 further includes various internal shared HW resources 430, such as an internal shared storage 432 (e.g. static RAM (SRAM), flash memory, etc.), which is shared by the application processing circuit 410 and the various peripheral subsystems 420 to store various runtime data or other parameters and to provide host memory. In the example of FIG. 4, the internal shared storage 432 includes the aforementioned key storage element, portion or component 433 that may be used to store public and private keys. In other examples, keys are stored elsewhere within the mobile device.

In one aspect, the components 410, 418, 420, 428 and 430 of the SoC 400 are integrated on a single-chip substrate. The SoC processing circuit 400 further includes various external shared HW resources 440, which may be located on a different chip substrate and may communicate with the SoC processing circuit 400 via one or more buses. External shared HW resources 440 may include, for example, an external shared storage 442 (e.g. double-data rate (DDR) dynamic RAM) and/or permanent or semi-permanent data storage 444 (e.g., a secure digital (SD) card, hard disk drive (HDD), an embedded multimedia card, a universal flash device (UFS), etc.), which may be shared by the application processing circuit 410 and the various peripheral subsystems 420 to store various types of data, such as an operating system (OS) information, system files, programs, applications, user data, audio/video files, etc. When the mobile communication device incorporating the SoC processing circuit 400 is activated, the SoC processing circuit begins a system boot up process in which the application processing circuit 410 may access boot ROM 418 to retrieve boot instructions for the SoC processing circuit 400, including boot sequence instructions for the various peripheral subsystems 420. The peripheral subsystems 420 may also have additional peripheral boot RAM 428.

Exemplary Digital Signature Signing and Verification Procedures

Figure 5:
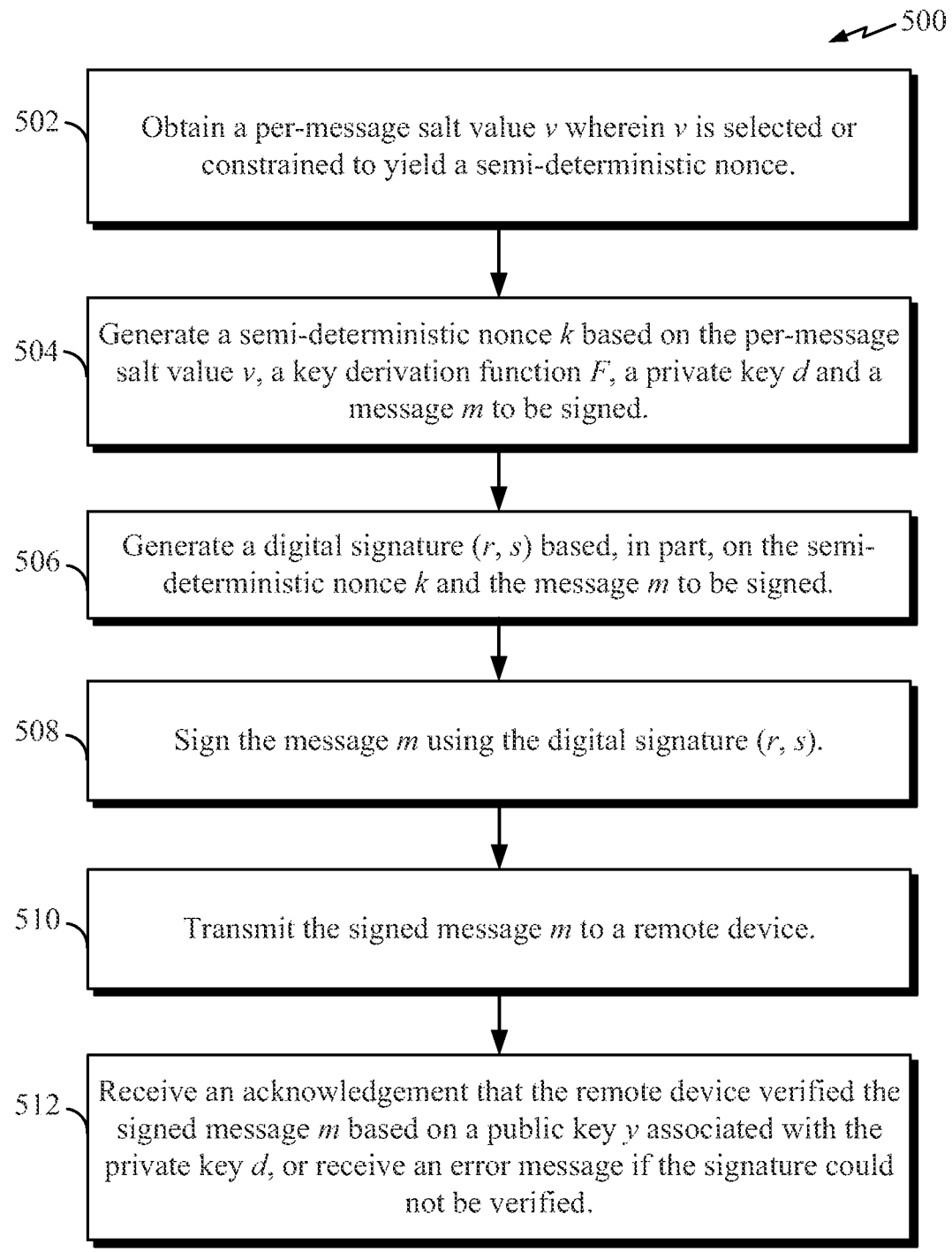
FIG. 5 provides an overview of an exemplary procedure for digital signature generation based on a nonce derived using a per-message value (i.e. a salt.)

FIG. 5 provides an overview of digital signature signing and verification operations 500 that may be employed by the digital signature processor of the application processing circuit of FIG. 4, or other suitable-equipped components, devices, systems or processing circuits. At 502, the digital signature processor obtains a per-message salt value v wherein v is selected or constrained to yield a semi-deterministic nonce. At 504, the digital signature processor generates a semi-deterministic nonce k based on the per-message salt value v, a key derivation function F, a private key d and a message m to be signed. At 506, the digital signature processor generates a digital signature (r, s) based on the semi-deterministic nonce k and the message m to be signed. At 508, the digital signature processor signs the message m by attaching the digital signature (r, s). At 510, the digital signature processor transmits the signed message m to a remote device, such as an on-line commercial transaction server, which will then attempt to verify the signature of the signed message based on a public key y associated with the private key d (wherein the public key was previously exchanged with the remote device.) As already noted, in many cases, the message m will also be encrypted, and such encryption may be separate and distinct from the digital signature generation procedures discussed herein. At 512, the digital signature processor receives an acknowledgement that the remote device verified the signed message m based on the public key y, or receives an error message if the signature could not be verified. The procedure of FIG. 5 may be performed generally in accordance with DSA/ECDSA or other nonce-based digital signature standards and protocols, modified to exploit a nonce derived using a salt.

FIG. 6 illustrates an exemplary procedure 600 for generating a digital signature based on a nonce derived from a salt wherein further illustrative details are provided. At 602, the digital signature processor obtains a per-message salt value v sufficient to yield a non-random and non-deterministic nonce (i.e. a semi-deterministic nonce) where, e.g., the salt v is a secret nonce, a public nonce, a counter, a context-specific message, an empty string or the result of any suitable semi-deterministic function s(x) or where the salt is randomly obtained within a restricted range of values (relative to a full range of values associated with a digital signature generation protocol used to generate a digital signature from a nonce) so that the resulting nonce is not fully random. In this regard, the digital signature processor may, for example, employ a context-specific message rather than a mere counter to impart a greater amount of non-determinism to the resulting nonce k. To obtain a still greater amount of non-determinism, the digital signature processor may, for example, employ a secret nonce rather than a context-specific message where the secret nonce provides a greater degree of non-determinism relative to the context-specific message. As noted, the digital signature processor may obtain the salt randomly from within a restricted range of values. In this regard, DSA conventionally operates to take k uniformly and randomly from 1 to q−1 where q is the multiplicative order of the generator (on the order of 256 bits). Hence, at 602, the per-message salt value v may be randomly selected from within a much smaller set of values (e.g. it may be uniformly and randomly selected from among only 32 bit values.) In general, the semi-deterministic function s(x) may be chosen or selected so as to set, adjust or control the degree of non-determinism of the resulting per-message salt value v to thereby set, adjust or control the degree of non-determinism of the resulting nonce k.

At 604, the digital signature processor generates the nonce k based on the per-message salt value v, an HMAC key derivation function, a private key d and a message m to be signed by, for example: concatenating the private key d with the per-message salt value v to yield a concatenated value; applying a hash function h to the message m to yield a hashed message h(m); and applying the HMAC function to the concatenated value and the hashed message to yield the nonce k, e.g.:

$$k=\text{HMAC}(d\|v,h(m)) \qquad (11)$$

or $$k=\text{HMAC}(v\|d,h(m)). \qquad (12)$$

At 606, the digital signature processor generates a digital signature (r,s) based, in part, on nonce k and signs the message m using, for example, DSA procedures:

$$r=g^k \bmod p \bmod q \qquad (13)$$

and $$s=k^{-1}(h(m)+rd) \bmod q \qquad (14)$$

where p is a prime, q is a group order and g is a group generator (as discussed above), or using other nonce-based procedures such as ECDSA, El Gamal, Schnorr, Nyberg-Rueppel, Russian standard GOST R 34.10-2001 Digital Signature Algorithm or Korean Certificate-based DSA (KCDSA).

Exemplary Systems and Methods

Figure 7:
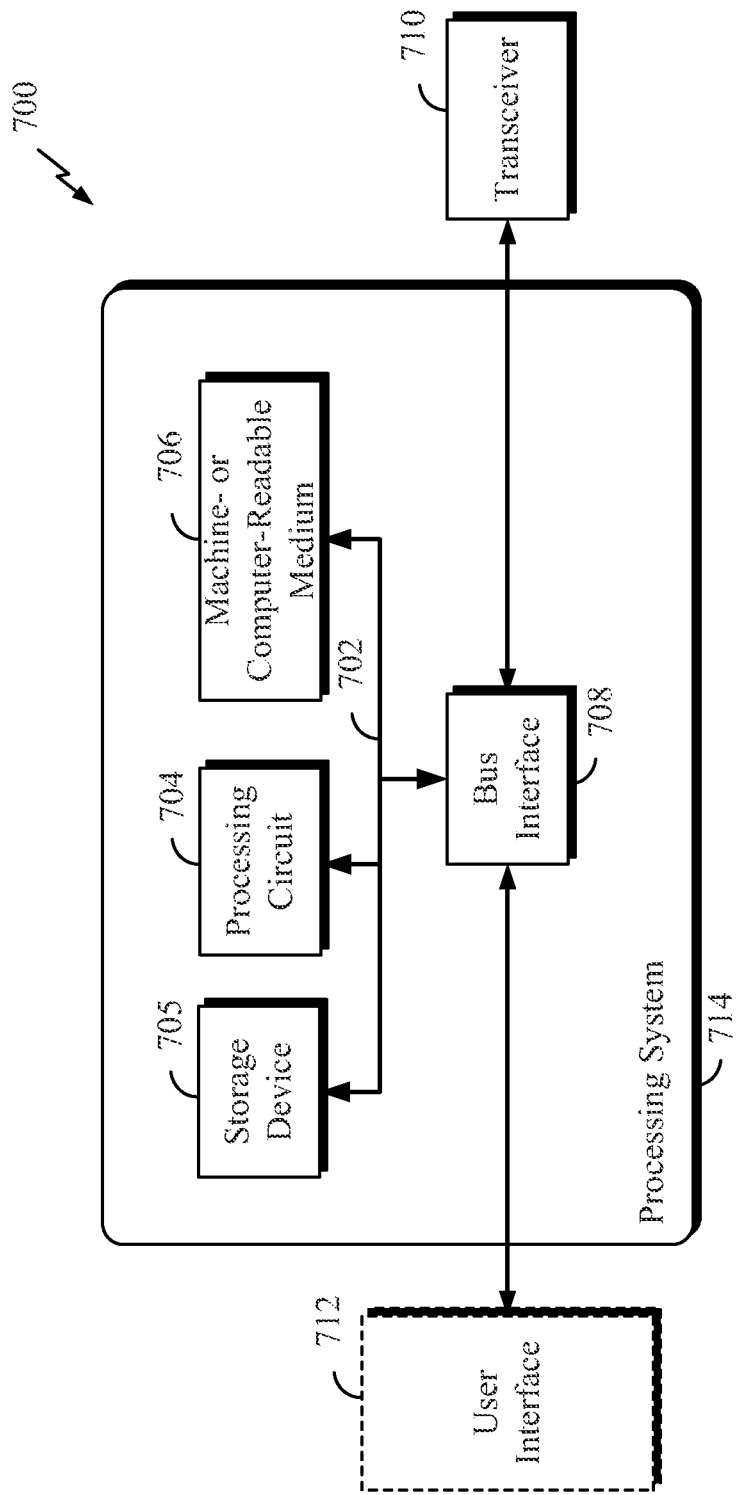
FIG. 7 is a block diagram illustrating an example of a hardware implementation for an apparatus employing a processing system that may exploit the systems, methods and apparatus of FIGS. 1-6.

FIG. 7 illustrates an overall system or apparatus 700 in which the systems, methods and apparatus of FIGS. 1-6 may be implemented. In accordance with various aspects of the disclosure, an element, or any portion of an element, or any combination of elements may be implemented with a processing system 714 that includes one or more processing circuits 704 such as the SoC processing circuit of FIG. 4. For example, apparatus 700 may be a user equipment (UE) of a mobile communication system. Apparatus 700 may be used with a radio network controller (RNC). In addition to an SoC, examples of processing circuits 704 include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 704, as utilized in the apparatus 700, may be used to implement any one or more of the processes described above and illustrated in FIGS. 3, 5 and 6 (and those illustrated in FIGS. 10-12, discussed below), such as processes to perform digital signature generation, signing and verification.

In the example of FIG. 7, the processing system 714 may be implemented with a bus architecture, represented generally by the bus 702. The bus 702 may include any number of interconnecting buses and bridges depending on the specific application of the processing system 714 and the overall design constraints. The bus 702 links various circuits including one or more processing circuits (represented generally by the processing circuit 704), the storage device 705, and a machine-readable, processor-readable, processing circuit-readable or computer-readable media (represented generally by a non-transitory machine-readable medium 706.) The bus 702 may also link various other circuits such as timing sources, peripherals, voltage regulators, and power management circuits, which are well known in the art, and therefore, will not be described any further. The bus interface 708 provides an interface between bus 702 and a transceiver 710. The transceiver 710 provides a means for communicating with various other apparatus over a transmission medium. Depending upon the nature of the apparatus, a user interface 712 (e.g., keypad, display, speaker, microphone, joystick) may also be provided.

The processing circuit 704 is responsible for managing the bus 702 and for general processing, including the execution of software stored on the machine-readable medium 706. The software, when executed by processing circuit 704, causes processing system 714 to perform the various functions described herein for any particular apparatus. Machine-readable medium 706 may also be used for storing data that is manipulated by processing circuit 704 when executing software.

One or more processing circuits 704 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 706. The machine-readable medium 706 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 706 may reside in the processing system 714, external to the processing system 714, or distributed across multiple entities including the processing system 714. The machine-readable medium 706 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system. For example, the machine-readable storage medium 706 may have one or more instructions which when executed by the processing circuit 704 causes the processing circuit to: obtain a non-random and non-deterministic nonce; and obtain a digital signature based in part on the non-random and non-deterministic nonce.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processing circuit, a digital signal processing circuit (DSP), an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessing circuit, but in the alternative, the processing circuit may be any conventional processing circuit, controller, microcontroller, or state machine. A processing circuit may also be implemented as a combination of computing components, e.g., a combination of a DSP and a microprocessing circuit, a number of microprocessing circuits, one or more microprocessing circuits in conjunction with a DSP core, or any other such configuration.

Hence, in one aspect of the disclosure, processing circuit 413 and/or 704 illustrated in FIGS. 4 and 7 may be a specialized processing circuit (e.g., an ASIC)) that is specifically designed and/or hard-wired to perform the algorithms, methods, and/or blocks described in FIGS. 3, 5 and/or 6 (and/or FIGS. 10, 11 and/or 12 discussed below.) Thus, such a specialized processing circuit (e.g., ASIC) may be one example of a means for executing the algorithms, methods, and/or blocks described in FIGS. 3, 5 and/or 6 (and/or FIGS. 10, 11 and/or 112, discussed below.) The machine-readable storage medium may store instructions that when executed by a specialized processing circuit (e.g., ASIC) causes the specialized processing circuit to perform the algorithms, methods, and/or blocks described herein.

Figure 8:
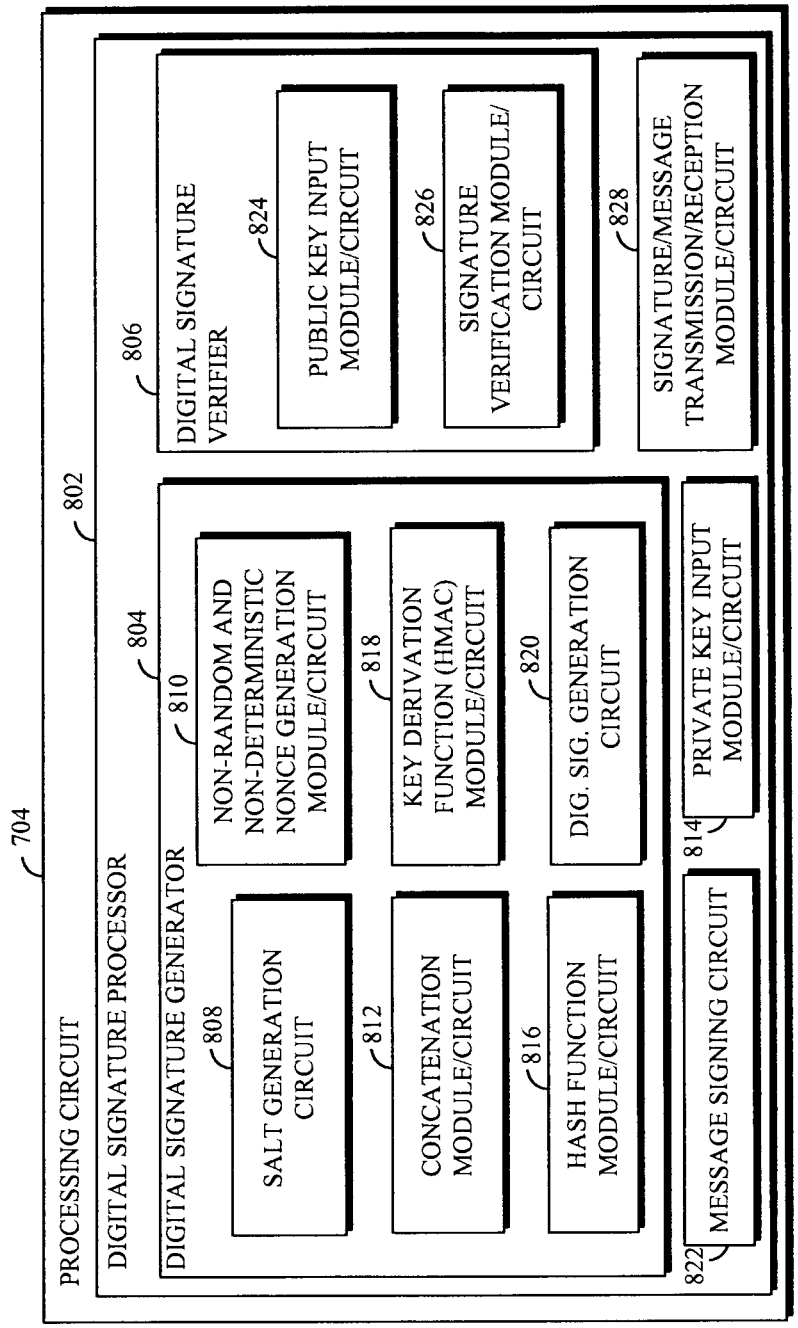
FIG. 8 is a block diagram illustrating exemplary components of the processing circuit of FIG. 7.

FIG. 8 illustrates selected and exemplary components of processing circuit 704 having a digital signature processor 802 having a digital signature generator 804 and a digital signature verifier 806. In particular, the digital signature generator 804 of FIG. 8 includes a salt generation circuit 808 operative to obtain or generate a per-message salt value v for use in generating a semi-deterministic nonce. The digital signature generator 804 also includes a non-random and non-deterministic nonce generation module/circuit 810 operative to obtain or generate a semi-deterministic nonce k for use in generating a digital signature or to control other modules/circuits to accomplish such operations. For example, a concatenation module/circuit 812 is to operative to concatenate a private key with the salt to yield a concatenated value, wherein the private key may be obtained by a private key input module/circuit 814 (which may include a pseudorandom number generator (PRNG.) A hash function module/circuit 816 is operative to apply a hash function to a message to be signed to yield a hashed message. A key derivation function (HMAC) module/circuit 816 is operative to apply a key derivation function such as HMAC to the concatenated value and the hashed message to yield the nonce under the control of the nonce generation module/circuit 810. A digital signature generation circuit 820 is operative to generate a digital signature based, in part, on the nonce generated by (or under the control of) the nonce generation module/circuit 810. A message signing circuit 822 is then operative to sign the message with the digital signature for transmission to a remote device using, for example, a signature/message transmission/reception module/circuit 828, which may be connected to transceiver 710 of FIG. 7.

Note that signing the message using the digital signature can be a simple matter of merely appending the signature to the message and hence, in practical implementations, a separate message signing module/circuit may not be provided. Moreover, in practical implementations, the entire digital signature generator may be referred to as a message signing module as it serves to sign messages using digital signatures. Separate signature generation and message signing components are not needed but are shown separately for the sake of completeness and generality. If the digital signal processor 802 needs to verify a signature received from a remote device, a public key input module/circuit 824 inputs or otherwise obtains a public key (via transceiver 710 of FIG. 7.) A signature verification module/circuit 826 is then operative to verify the signature of a signed message received from the remote device using the public key.

Figure 9:
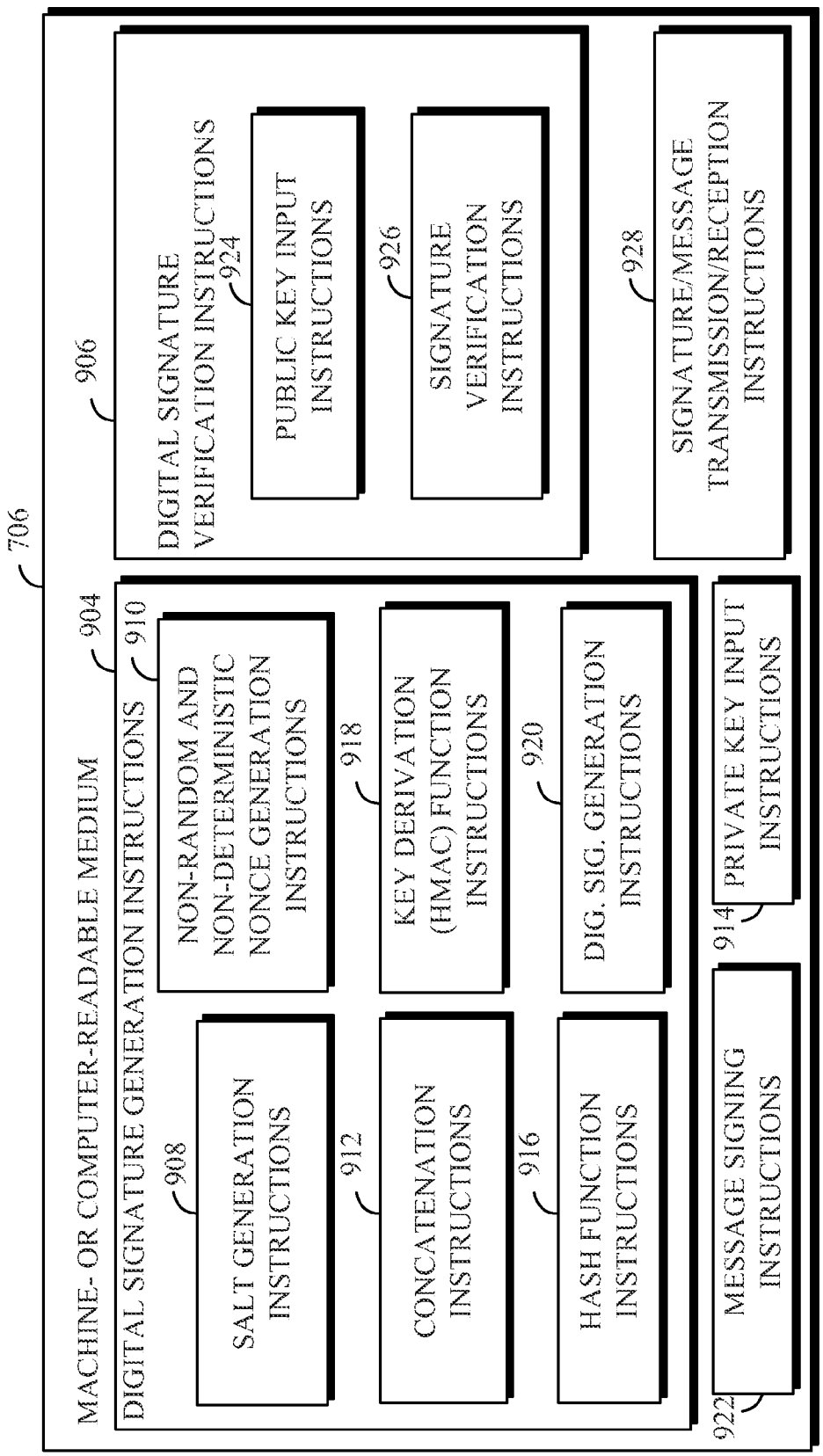
FIG. 9 is a block diagram illustrating exemplary instruction components of the machine-readable medium of FIG. 7.

FIG. 9 illustrates selected and exemplary instructions of machine- or computer-readable medium 706 for use in generating or verifying digital signatures. Briefly, the machine-readable medium 706 of FIG. 9 includes various instructions, which when executed by the processing circuit 704 of FIG. 7, cause the processing circuit to control or perform digital signature generation and verification operations. In particular, the digital signature generation instructions 904 of FIG. 9 include salt generation instructions 908 operative to obtain or generate a per-message salt value v for use in generating a nonce. Non-random and non-deterministic nonce generation instructions 910 are operative to obtain or generate a semi-deterministic nonce k for use in generating a digital signature. Concatenation instructions 912 are to operative to concatenate a private key with the salt to yield a concatenated value, wherein the private key may be obtained by private key input instructions 914. Hash function instructions 916 are operative to apply a hash function to a message to be signed to yield a hashed message. Key derivation function (HMAC) instructions 916 are operative to apply a key derivation function such as HMAC to the concatenated value and the hashed message to yield the nonce. Digital signature generation instructions 920 are operative to generate a digital signature based, in part, on the nonce generated by (or under the control of) the nonce generation instructions 910. Message signing instructions 922 are then operative to sign the message with the digital signature for transmission to a remote device using, for example, signature/message transmission/reception instructions 928. Comments noted above with reference to module 822 of FIG. 8 are applicable here too. If the digital signal processor needs to verify a signature received from a remote device, public key input instructions 924 input or otherwise obtain a public key from the remote device (via transceiver 710 of FIG. 7.) Signature verification instructions 926 are then operative to verify the signature of a signed message received from the remote device using the public key.

Figure 10:
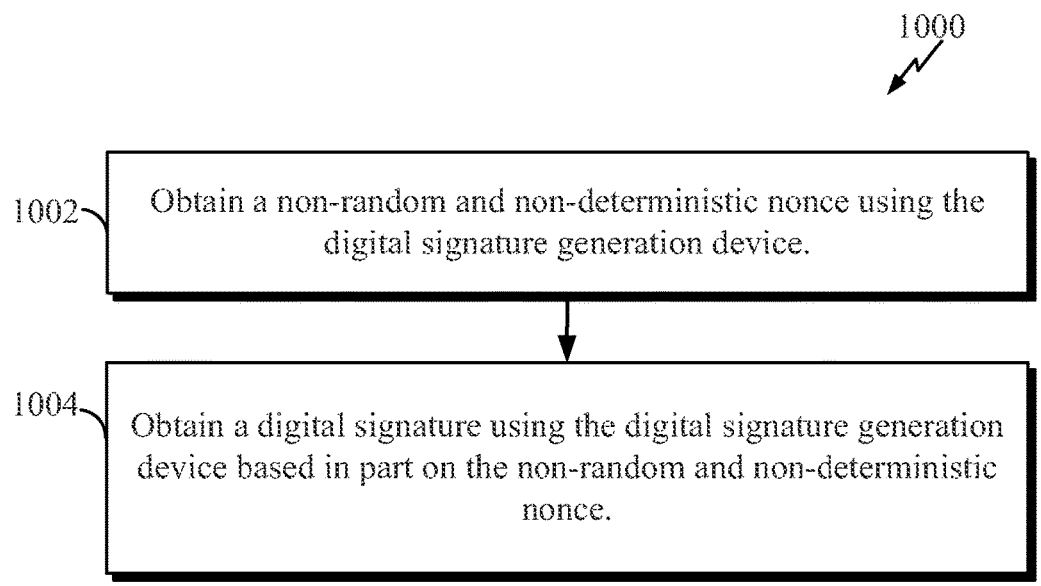
FIG. 10 provides another overview of exemplary procedures for use with digital signature generation where a nonce is derived from a per-message value (i.e. a salt.)

FIG. 10 broadly illustrates and summarizes methods or procedures 1000 that may be performed by the digital signature generator 804 of FIG. 8 or other suitably equipped digital signature generating devices for generating or otherwise obtaining digital signatures such as application processing circuit 410 of FIG. 4. At 1002, the digital signature generator obtains a non-random and non-deterministic nonce and, at 1004, the digital signature generator obtains a digital signature based in part on the non-random and non-deterministic nonce using, for example, the techniques described above.

Figure 11:
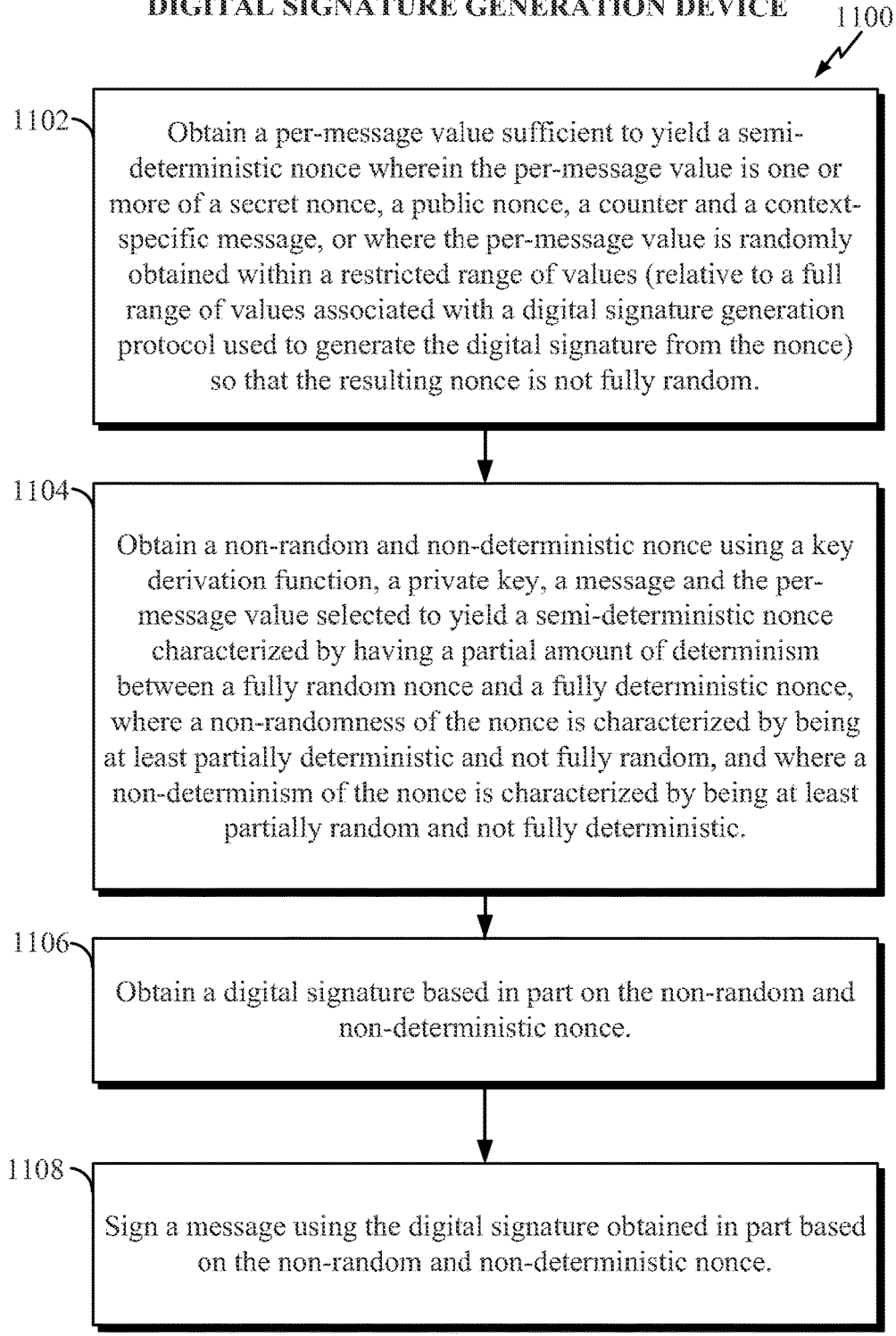
FIG. 11 provides an overview of exemplary procedures for use with digital signature generation where a nonce is generated semi-deterministically.

FIG. 11 illustrates exemplary methods or procedures 1100 that may be performed by the digital signature processor 802 of FIG. 8 or other suitably equipped devices. At 1102, the digital signature processor 802 generates or otherwise obtains a per-message value sufficient to yield a semi-deterministic nonce wherein the per-message value is one or more of a secret nonce, a public nonce, a counter and a context-specific message, or where the per-message value is randomly obtained within a restricted range of values (relative to a full range of values associated with a digital signature generation protocol used to generate the digital signature from the nonce) so that the resulting nonce is not fully random. At 1104, the digital signature processor 802 generates or otherwise obtains a non-random and non-deterministic nonce using a key derivation function, a private key, a message and the per-message value selected to yield a semi-deterministic nonce characterized by having a partial amount of determinism between a fully random nonce and a fully deterministic nonce, where a non-randomness of the nonce is characterized as being at least partially deterministic and not fully random, and where a non-determinism of the nonce is characterized as being at least partially random and not fully deterministic. At 1106, the digital signature processor 802 generates or otherwise obtains a digital signature based in part on the non-random and non-deterministic nonce. At 1108, the digital signature processor 802 signs a message using the digital signature obtained in part based on the non-random and non-deterministic nonce. As already noted, signing a message may simply involve attaching the digital signature to the message, and hence a separate signature generation and message signing components are not needed but are shown separately for the sake of completeness and generality.

Figure 12:
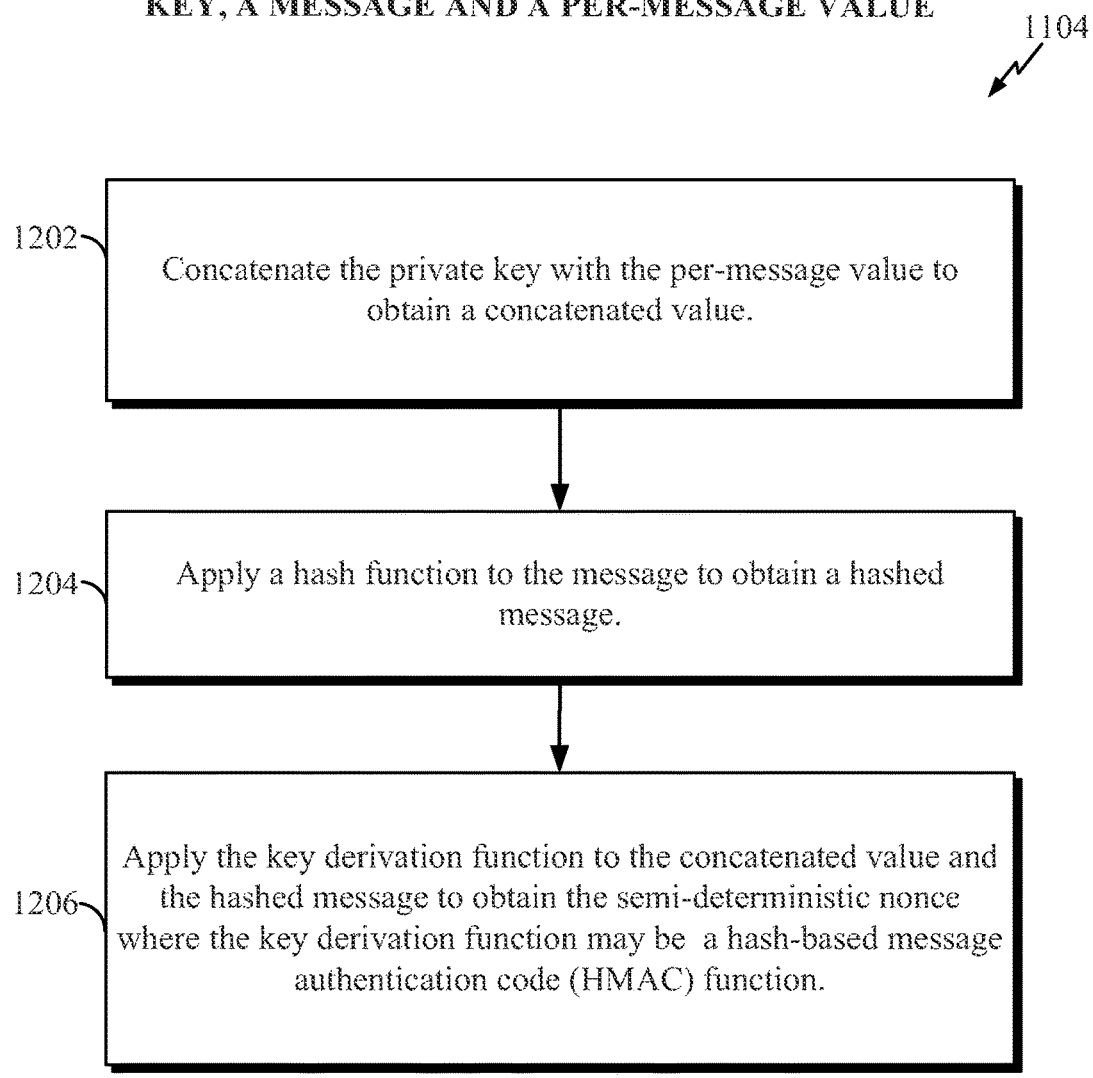
FIG. 12 provides further exemplary procedures for use with digital signature generation.

FIG. 12 illustrates exemplary methods or procedures that may be performed by the digital signature processor 802 of FIG. 8 or other suitably equipped digital signature generating devices for use at block 1104 of FIG. 11 for obtaining or otherwise generating a nonce using a key derivation function, a private key, a message and a per-message value. At 1202, the digital signature processor 802 concatenates the private key with the per-message value to obtain a concatenated value. At 1204, the digital signature processor 802 applies a hash function to the message to obtain a hashed message. At 1206, the digital signature processor 802 applies the key derivation function to the concatenated value and the hashed message to obtain the semi-deterministic nonce where the key derivation function may be a HMAC function.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in an electronic digital signature generation device for obtaining a digital signature, comprising:
controlling, by a processing circuit, a semi-deterministic nonce generation component of the electronic digital signature generation device to obtain a semi-deterministic nonce that has a partial amount of determinism between a random nonce and a deterministic nonce and is more deterministic than a nonce obtained randomly or pseudorandomly from within a full range of values associated with a digital signature generation protocol used by the digital signature generation device to obtain digital signatures;
controlling, by the processing circuit, a digital signature generation component of the electronic digital signature generation device to obtain a digital signature based in part on the semi-deterministic nonce; and
controlling, by the processing circuit, a message signing component of the digital signature generation device to sign a message using the digital signature generated based, in part, on the semi-deterministic nonce.

2. The method of claim 1, wherein the semi-deterministic nonce is obtained by the semi-deterministic nonce generation component so as to be less deterministic than a fully deterministic nonce obtained for use with a message where the same message to be signed will always result in the same nonce.

3. The method of claim 2, wherein the semi-deterministic nonce is obtained by the semi-deterministic nonce generation component using a key derivation function, a private key, a message and a per-message value selected to yield the semi-deterministic nonce.

4. The method of claim 3, wherein the per-message value used by the semi-deterministic nonce generation component is one or more of a secret nonce, a public nonce, a counter and a context-specific message.

5. The method of claim 3, wherein the per-message value obtained by the semi-deterministic nonce generation component is randomly or pseudorandomly obtained within a restricted range of values relative to the full range of values associated with the digital signature generation protocol used to generate the digital signature from the message so that the resulting nonce is not fully random.

6. The method of claim 5, wherein the digital signature generation protocol used by the digital signature generation component to generate the digital signature from the nonce includes one or more of Digital Signature Algorithm (DSA), Elliptic Curve DSA (ECDSA), El Gamal, Schnorr, Nyberg-Rueppel, Russian standard GOST R 34.10-2001 Digital Signature Algorithm and Korean Certificate-based DSA (KCDSA) protocols.

7. The method of claim 3, wherein the semi-deterministic nonce is obtained based on the per-message value, the key derivation function, the private key and the message by:
concatenating the private key with the per-message value within a memory of the digital signature generating device to obtain a concatenated value;
applying a hash function to the message to obtain a hashed message; and
applying the key derivation function to the concatenated value and the hashed message to obtain the semi-deterministic nonce.

8. A device comprising:
a processing circuit configured to:
obtain a semi-deterministic nonce using a semi-deterministic nonce generation component of the processing circuit, wherein the semi-deterministic nonce is characterized by having a partial amount of determinism between a random nonce and a deterministic nonce and wherein the semi-deterministic nonce is more deterministic than a nonce obtained randomly or pseudorandomly from within a full range of values associated with a digital signature generation protocol used by the digital signature generation device to obtain digital signatures,
obtain a digital signature based in part on the semi-deterministic nonce using a digital signature generation component of the processing circuit, and
control a message signing component of the digital signature generation device to sign a message using the digital signature generated based, in part, on the semi-deterministic nonce.

9. The device of claim 8, wherein the semi-deterministic nonce is obtained by the semi-deterministic nonce generation component of the processing circuit so as to be less deterministic than a fully deterministic nonce obtained for use with a message where the same message to be signed will always result in the same nonce.

10. The device of claim 9, wherein the semi-deterministic nonce generation component of the processing circuit is configured to obtain the semi-deterministic nonce using a key derivation function, a private key, a message and a per-message value selected to yield the semi-deterministic nonce.

11. The device of claim 10, wherein the per-message value used by the semi-deterministic nonce generation component is one or more of a secret nonce, a public nonce, a counter and a context-specific message.

12. The device of claim 10, wherein the semi-deterministic nonce generation component of the processing circuit is configured to obtain the per-message value randomly or pseudorandomly within a restricted range of values relative to the full range of values associated with the digital signature generation protocol used to generate the digital signature from the message so that the resulting nonce is not fully random.

13. The device of claim 12, wherein the digital signature generation protocol used by the digital signature generation component of the processing circuit to generate the digital signature from the nonce includes one or more of Digital Signature Algorithm (DSA), Elliptic Curve DSA (ECDSA), El Gamal, Schnorr, Nyberg-Rueppel, Russian standard GOST R 34.10-2001 Digital Signature Algorithm and Korean Certificate-based DSA (KCDSA) protocols.

14. The device of claim 10, wherein the processing circuit is configured to obtain the semi-deterministic nonce based on the per-message value, the key derivation function, the private key and the message by:
concatenating the private key with the per-message value within a memory of the digital signature generating device to obtain a concatenated value;
applying a hash function to the message to obtain a hashed message; and
applying the key derivation function to the concatenated value and the hashed message to obtain the semi-deterministic nonce.

15. An electronic digital signature generation device comprising:
semi-deterministic nonce generation means for obtaining a semi-deterministic nonce, wherein the semi-deterministic nonce is characterized by having a partial amount of determinism between a random nonce and a deterministic nonce and wherein the semi-deterministic nonce is more deterministic than a nonce obtained randomly or pseudorandomly from within a full range of values associated with a digital signature generation protocol used by the digital signature generation device to obtain digital signatures;
digital signature generation means for obtaining a digital signature based in part on the semi-deterministic nonce; and
message signing means for signing a message using the digital signature generated based, in part, on the semi-deterministic nonce.

16. The device of claim 15, wherein the semi-deterministic nonce is obtained by the semi-deterministic nonce generation means so as to be less deterministic than a fully deterministic nonce obtained for use with a message where the same message to be signed will always result in the same nonce.

17. A non-transient machine-readable storage medium for controlling the operations of at least one processing circuit of an electronic digital signature generation device to obtain a digital signature, the machine-readable storage medium having one or more instructions which when executed by the at least one processing circuit causes the at least one processing circuit to:
control a semi-deterministic nonce generation component of the electronic digital signature generation device to obtain a semi-deterministic nonce, wherein the semi-deterministic nonce is characterized by having a partial amount of determinism between a random nonce and a deterministic nonce and wherein the semi-deterministic nonce is more deterministic than a nonce obtained randomly or pseudorandomly from within a full range of values associated with a digital signature generation protocol used by the digital signature generation device to obtain digital signatures; and
control a digital signature generation component of the electronic digital signature generation device to obtain a digital signature based in part on the semi-deterministic nonce; and
control a message signing component of the digital signature generation device to sign a message using the digital signature generated based, in part, on the semi-deterministic nonce.

18. The non-transient machine-readable storage medium of claim 17, further including instructions for controlling the semi-deterministic nonce generation component to obtain the semi-deterministic nonce using a key derivation function, a private key, a message and a per-message value selected to yield the semi-deterministic nonce.

19. The non-transient machine-readable storage medium of claim 18, further including instructions for controlling the semi-deterministic nonce generation component to:

concatenate the private key with the per-message value within a memory of the digital signature generating device to obtain a concatenated value;
apply a hash function to the message to obtain a hashed message; and
apply the key derivation function to the concatenated value and the hashed message to obtain the semi-deterministic nonce.

20. The non-transient machine-readable storage medium of claim 17, wherein the semi-deterministic nonce is obtained by the semi-deterministic nonce generation component so as to be less deterministic than a fully deterministic nonce obtained for use with a message where the same message to be signed will always result in the same nonce.

21. The non-transient machine-readable storage medium of claim 18, wherein the instructions are operative to control the semi-deterministic nonce generation component to obtain the per-message value randomly or pseudorandomly from within a restricted range of values relative to the full range of values associated with the digital signature generation protocol used to generate the digital signature from the message so that the resulting nonce is not fully random.

22. The method of claim 1, wherein the semi-deterministic nonce is obtained by the semi-deterministic nonce generation component using a per-message value selected randomly or pseudorandomly from within a restricted range of values relative to a full range of values associated with a multiplicative factor (q) used by the digital signature generation component.

23. The device of claim 8, wherein the semi-deterministic nonce is obtained by the semi-deterministic nonce generation component using a per-message value selected randomly or pseudorandomly from within a restricted range of values relative to a full range of values associated with a multiplicative factor (q) used by the digital signature generation component.

24. The electronic digital signature generation device of claim 15, wherein the semi-deterministic nonce is obtained by the semi-deterministic nonce generation means using a per-message value selected randomly or pseudorandomly from within a restricted range of values relative to a full range of values associated with a multiplicative factor (q) used by the digital signature generation component.

25. The non-transient machine-readable storage medium of claim 17, further including instructions to obtain the semi-deterministic nonce using a per-message value selected randomly or pseudorandomly from within a restricted range of values relative to a full range of values associated with a multiplicative factor (q) used by the digital signature generation component.

26. The method of claim 1, further including controlling a transmitter to transmit the signed message to a separate device.

27. The method of claim 1, further including:
receiving a signed message that was signed by another device based on a digital signature obtained using a semi-deterministic nonce; and
verifying the received signed message.

28. The device of claim 8, further including a transmitter equipped to transmit the signed message to a separate device.

29. The device of claim 8, further including a receiver equipped to receive a signed message that was signed by another device based on a digital signature obtained using a semi-deterministic nonce and wherein the processor is further configured to control a verification component of the device to verify the digital signature.

30. The method of claim 26, wherein the semi-deterministic nonce is obtained by the semi-deterministic nonce generation component using a key derivation function, a private key, a message and a per-message value selected to yield the semi-deterministic nonce and further including receiving an acknowledgement that the separate device verified the signed message based on a public key associated with the private key.

31. The method of claim 28, wherein the semi-deterministic nonce is obtained by the semi-deterministic nonce generation component using a key derivation function, a private key, a message and a per-message value selected to yield the semi-deterministic nonce and further including receiving an acknowledgement that the separate device verified the signed message based on a public key associated with the private key.

32. The device of claim 15, wherein the semi-deterministic nonce is obtained by the semi-deterministic nonce generation means using a key derivation function, a private key, a message and a per-message value selected to yield the semi-deterministic nonce and further including means for transmitting the signed message to a separate device and means for receiving an acknowledgement that the separate device verified the signed message based on a public key associated with the private key.

* * * * *